US009606983B1

(12) United States Patent
McClintock et al.

(10) Patent No.: US 9,606,983 B1
(45) Date of Patent: Mar. 28, 2017

(54) HUMAN READABLE MECHANISM FOR COMMUNICATING BINARY DATA

(71) Applicant: Amazon Technologies, Inc., Reno, NV (US)

(72) Inventors: Jon Arron McClintock, Seattle, WA (US); Darren Ernest Canavor, Redmond, WA (US); Jesper Mikael Johansson, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/470,886

(22) Filed: Aug. 27, 2014

(51) Int. Cl.
*G06F 17/27* (2006.01)
*G06F 17/20* (2006.01)
*G06F 17/28* (2006.01)

(52) U.S. Cl.
CPC ...... *G06F 17/2765* (2013.01); *G06F 17/2735* (2013.01); *G06F 17/28* (2013.01)

(58) Field of Classification Search
None
See application file for complete search history.

(56) References Cited

U.S. PATENT DOCUMENTS

| | | | | |
|---|---|---|---|---|
| 5,062,047 A * | 10/1991 | Tanaka | ............... | G06F 17/271 704/3 |
| 5,668,928 A * | 9/1997 | Groner | ............... | G10L 15/193 704/243 |
| 7,036,075 B2 * | 4/2006 | Walker | ............... | G06F 17/211 434/169 |
| 8,972,445 B2 * | 3/2015 | Gorman | ............ | G06F 17/2785 707/771 |
| 2003/0204392 A1 * | 10/2003 | Finnigan | ............ | G06F 17/2735 704/10 |
| 2005/0005266 A1 * | 1/2005 | Datig | ................ | G06F 17/279 717/136 |
| 2010/0082333 A1 * | 4/2010 | Al-Shammari | ..... | G06F 17/2735 704/10 |
| 2014/0032584 A1 * | 1/2014 | Baker | ............. | G06F 3/04886 707/758 |
| 2014/0040312 A1 * | 2/2014 | Gorman | ............ | G06F 17/2785 707/771 |

* cited by examiner

*Primary Examiner* — Marcus T Riley
(74) *Attorney, Agent, or Firm* — Davis Wright Tremaine LLP

(57) ABSTRACT

A mechanism is provided for representing information, such as binary sequence, in a manner that is easier to read and less likely to generate errors when interacted with by human. A dictionary is seeded with two or more set of words, the words being selected from distinct categories. Symbols may be created by combining words from the distinct categories. A mapping of symbols to corresponding values may then be generated. The generated mapping may be used to translate bit values to symbols and symbols to bit values.

20 Claims, 10 Drawing Sheets

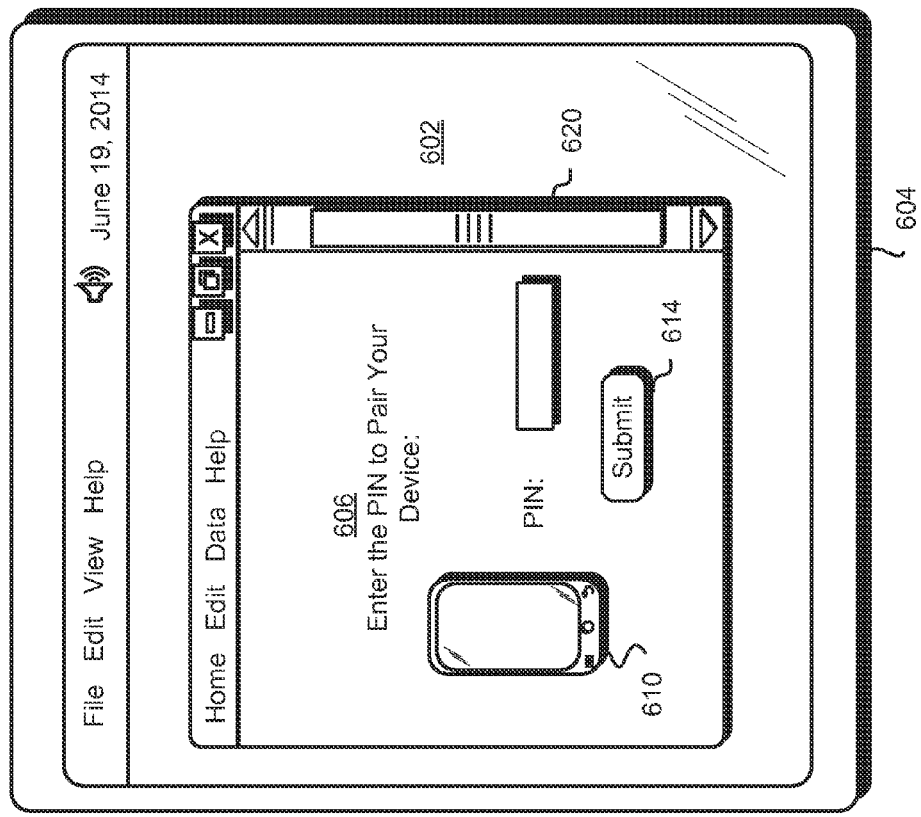
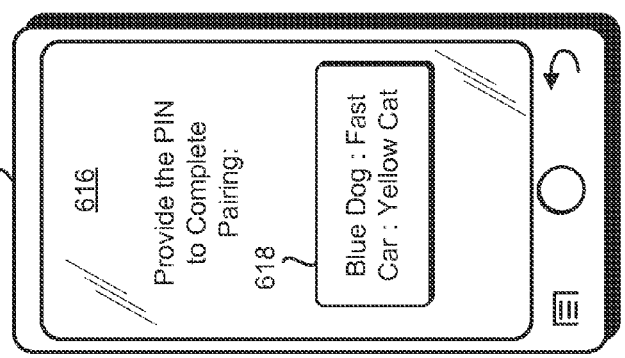
FIG. 6

HUMAN READABLE MECHANISM FOR COMMUNICATING BINARY DATA

BACKGROUND

The use of computers and computing services has greatly increased in recent years. Computers often communicate information as binary sequence, which may be converted to hexadecimal sequences in order to slightly improve readability for humans. There are a number of security-related scenarios where the ability to easily communicate a binary sequence or hexadecimal sequence is necessary. For example, validating a hash of a file or providing a public key fingerprint to authenticate or look up a longer public key. The communication may be between a human and a computer or between humans. Typically this is done by reading off a series of binary or hexadecimal digits, which may be burdensome and error prone. For example, a human may transpose one or more digits when reading the binary sequence. In another example, a human may inadvertently omit a digit when providing the binary sequence.

BRIEF DESCRIPTION OF THE DRAWINGS

Various embodiments in accordance with the present disclosure will be described with reference to the drawings, in which:

FIG. 6 is a diagram illustrating a security-related operation including human readable representations of binary or hexadecimal sequences in accordance with at least one embodiment;

DETAILED DESCRIPTION

Figure 1:
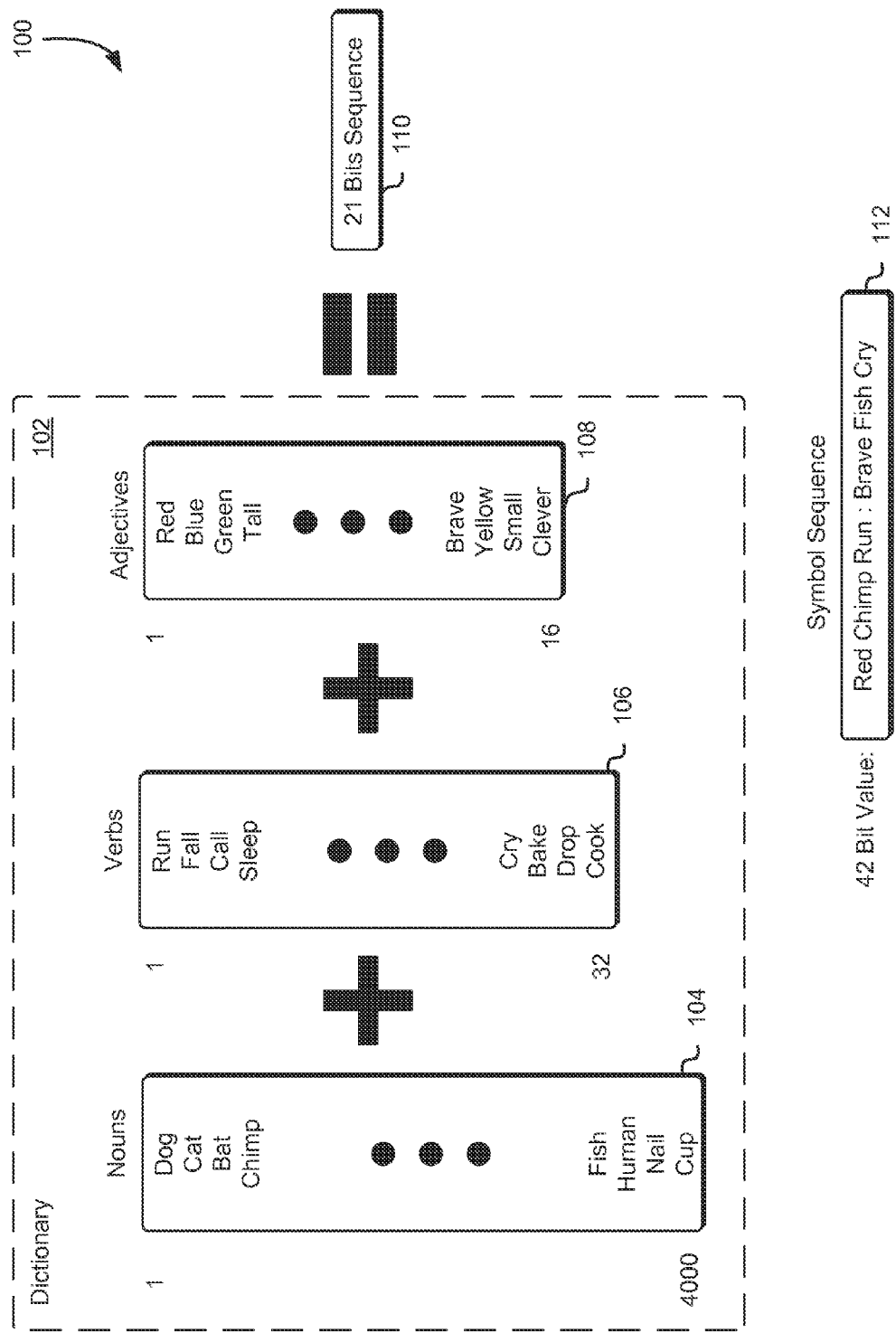
FIG. 1 is a diagram illustrating a mechanism for generating human readable representations of binary or hexadecimal sequences in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein allow for increased human readability and user experience when interacting with binary information generated by a computer system. In some embodiments, a dictionary of words may be used to generate a symbol table where each symbol in the table represents a binary sequence or other bits of data. For example, a dictionary may include a set of 4,000 nouns and 16 adjectives with each symbol containing one adjective and one noun. Each adjective-noun pair would then represents 16 bits of data, 12 bits of data corresponding to the 4,000 nouns and another 4 bits of data corresponding to the 16 adjectives. Given this representation a 128-bit binary sequence may be represented as a series of 8 symbols, each symbol consisting of one adjective-noun pair. Alternatively, a 32-digit hexadecimal sequence would be required to represent the same 128-bit binary sequence. Additionally, the dictionary may be populated with simple words thereby generating short easy-to-remember symbols such as 'yellow-bike,' 'green-dog,' and 'red-cow.'

This mechanism may be used in a variety of scenarios where binary or hexadecimal information is communicated or obtained by a human operator. For example, multi-factor authentication (MFA) devices, such as a Gemalto® token, typically generate an 8-digit decimal number which must be read off the token and entered into another device. Using the mechanism described above, the 8-digit decimal number may be replaced with one adjective-noun pair. Additionally, authentication information may be represented using one or more symbols generated from a dictionary of words. For example, a customer contacting a customer service representative may authenticate themselves using a set of word pairs generated by an application executed by the customer computing device. The set of word pairs may include 4 adjective-noun pairs representing a 64-bit time-limited unique authenticator for the customer.

In some embodiments, the dictionary may include other elements of speech such as verbs, adverbs, prepositions, pronouns and other elements of speech suitable for generating symbols representative of binary or hexadecimal sequences. Additionally, the symbols may include any number of dictionary elements, for example, a symbol may include an adjective-noun-verb set such as 'red dog run,' 'smart cow sleep' and 'blue whale eat.' Elements not include in the dictionary may be added to symbols in order to improve human readability. For example, a preposition may be added to increase readability but may not be included in the dictionary, for example 'the red dog runs' or 'a blue whale eats.' The preposition may be placed in a position in the symbol such that the set of words in the symbol are grammatically correct, as illustrated in the previous example. The dictionary and corresponding symbol table may be generated on a per application basis, a per users basis, a per use basis or other basis capable of differentiation. Furthermore, the dictionary and corresponding symbol table may be generated by a computing resource service provider (also referred to simply as a service provider) and offered as a service to user. For example, a user may provide a set of symbols (also referred to as a sequence of symbol) to the service provider and the service provider may convert the set of symbols to the corresponding binary sequence and provider the binary sequence to another computer system on behalf of the user. The use of the symbols described herein may increase efficiency of computer systems and reduce errors during the operation of computer systems. Other advantages may include some or all of higher data throughput, higher security, higher efficiency, fewer errors, and improved interface between humans and computer systems.

FIG. 1 shows a diagram 100 illustrating various aspects of the present disclosure. In the illustrated embodiment, the diagram 100 shows a dictionary 102 which may be used to generate symbols 110 representative of binary data. The symbols 110 may be generated from sets of words included in the dictionary such as nouns 104, verbs 106 and adjectives 108. In some embodiments, the words to be included in the dictionary 102 have semantic meaning (e.g., the words have at least some meaning in a language). Additionally, the dictionary 102 may be a spelling dictionary (e.g., a dictionary without definitions of the words included in the dictionary). As described herein, a dictionary 102 may include a collection of words useable in generating one or more symbols that may be mapped to corresponding value. The mapped values may be considered identifying sequences that correspond to particular items and may be used for identifying the items. For example, the identifying sequences may map to a serial number, personal identification number, media access control address (MAC address), vendor number, bar code, inventory number, item number, physical address, Internet protocol address (IP address), port number, cryptographic key, password, security code, random number, hash value or other value representable by a sequence of bits that may be used for identify the item. As described in greater detail below in connections with FIGS. 5-7, the identifying sequences may correspond to an item that may be used for a particular purpose, such as navigating to a webpage or pairing two devices.

At least a portion of the symbols may be mapped to particular bit values as indicated by a symbol table. Furthermore the mapping may be reversible, such that a data value may be converted from bits to symbols based at least in part on the symbol tables. As described herein the symbol table may include a map, a table, an algorithm, a set of operations, a deterministic function or other mechanism suitable receiving an input and determining a corresponding output. As illustrated by FIG. 1, the dictionary 102 contains 4,000 nouns 104, 32 verbs 106 and 16 adjectives 108, the combination of which yields a 21-bit symbol 110. For example, the symbol 'brave chimp sleep' may represent a 21-bit binary sequence or other data such as a hexadecimal or alphanumeric sequence.

Multiple symbols may be combined in order to generate representations of higher bit values. For example, a symbol sequence 112 containing two symbols 110 may represent a 42-bit value as illustrated in FIG. 1. Words in the symbols 110 may be normalized such that words in the symbols appear in the same order in the normalized symbols 110. As illustrated in FIG. 1, the word order may be normalized to adjective-noun-verb order such that each normalized symbol 110 contains an adjective, a noun and a verb in the ascribed order, for example, the symbol 'red chimp run.' Furthermore, the dictionary 102 may change according to the language or region designated by a user or a computing device. For example, a mobile device may utilize the above-mentioned mechanism to display binary information to users of the mobile device. Furthermore, the mobile device may obtain a dictionary based at least in part on the region settings of the mobile device, such as United States English. If the user then changes the language or region setting of the mobile device, the mobile device may then seed the dictionary with words from the particular language or region selected. In some embodiments, the symbols may be normalized based at least in part on the language or region selected. For example, in some languages, such as Russian, word order may be changed without changing the meaning of the words or affecting human readability. However, in other languages, such as English, word order may affect meaning and human readability and therefore may be normalized to account for word order. In some embodiments, the words may include characters or symbols. For example, the dictionary may include words consisting of Chinese characters.

As described herein, a word may be considered the smallest element that may be used in isolation while maintaining semantic or pragmatic content (e.g., literal or practical meaning) Words included in the dictionary 102 may include one or more morphemes which is the smallest grammatical unit in a language. In some embodiments, words may be morphemes as described in greater detail below. Additionally, in some embodiments, the dictionary 102 may be seeded with morphemes. For example, the dictionary 102 utilizing morphemes may include 'pumpkin' and 'ness.' The morpheme 'pumpkin' may be classified as a word while the morpheme 'ness' may not be classified as a word. In another example, the symbol 'un broccoli able' may be generated using a dictionary seed with morphemes. The words or morphemes included in the dictionary 102 may be considered the symbol space. The symbols space is the set of things which may be used to generate the symbols, (i.e., the set of words or morphemes available to generate the symbols). The size of the symbol space as described above may determine the size of the bit sequence a particular symbol or sequence of symbols may represent. For example, the symbol space described above consisting of 4,000 nouns and 16 adjectives may represent a 16-bit sequence.

Furthermore, the words or morphemes included in the dictionary may be used, as described above, to generate n-tuplets, such as an order pair. For example, the adjective-noun pairs described above may be considered an order pair. Additionally, the order pairs may be extended to include 'n' items. For example, the symbols generated from the dictionary 102 may include an adjective-noun-verb tuplet. In another example, the symbols generated from the dictionary 102 may include a preposition-verb-noun-adjective tuplet. In various embodiments, the n-tuplets may be ordered such that the order in which that items appear in the n-tuplet is significant. For example, the ordered n-tuplet (where n=2) 'yellow dog' is different from 'dog yellow.' Furthermore, the dictionary 102 may be seeded with two or more sets of words or morphemes that the two or more sets are disjointed (e.g., do not have any members in common). For example, a dictionary 102 seeded with the set of adjectives and the set of verbs may be disjointed in that there are not words in common between the set of adjectives and the set of verbs. In some embodiments, the symbol may be configured such the category of the word and/or the location of the word in the symbol may have no corresponding bit value. For example, the second word in a three word symbol may have no corresponding bit value.

The dictionary 102 may also be a curated dictionary such that the words included in the dictionary are selected based at least in part on one or more various factors including length, difficulty to read, difficulty to pronounce, grade level or other factors suitable for discriminating between words that may be included in the dictionary 102. For example, the dictionary 102 may be curated such that homonyms, homophone, homographs, heteronyms and other words that may produce human errors are removed. These categories of words may cause errors such that one or more words in a symbol are misread and or replace with another word. For example, the word "air" and "heir" or "die" and "dye" may be interchanged when read by a human. Alternatively, the symbol table may be configured such that homonyms, homophones, homographs, heteronyms and other words that may produce human errors map to identical values to avoid errors. For example, the words "fairy" and "ferry" may map to equivalent values such that interchanging these words in a symbol do not cause the symbol to map to a different value. In another example, the mechanism may be used in connection with voice recognition software to capture the symbol or set of symbols from the human operator, in such scenarios, the dictionary 102 may be curated to include words that are recognizable by the voice recognition software.

Figure 2:
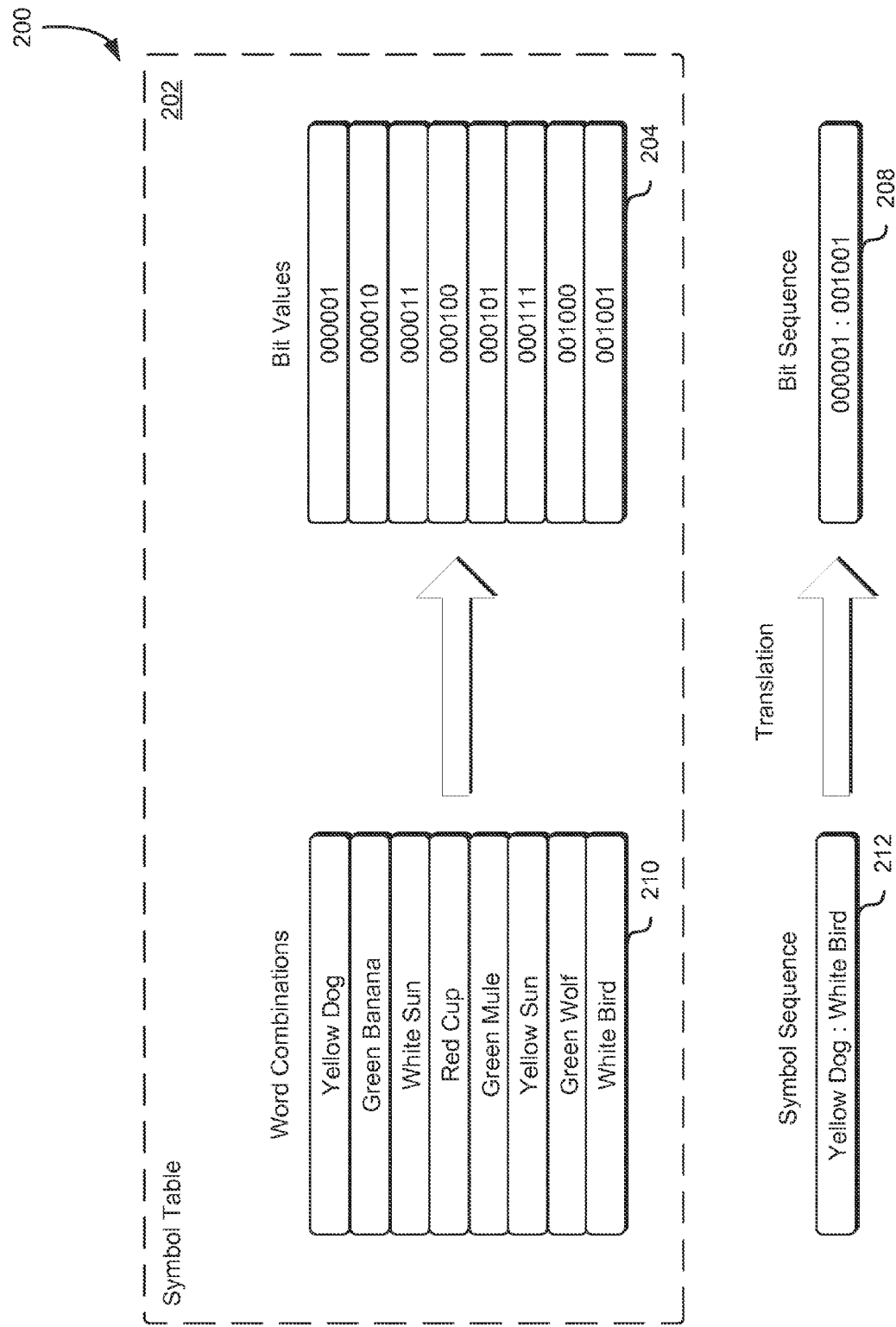
FIG. 2 is a diagram illustrating a mapping of human readable representations to corresponding bit values in accordance with at least one embodiment.

FIG. 2 shows a diagram 200 illustrating various aspects of the present disclosure. In the illustrated embodiment, the diagram 200 shows a symbol table 202 mapping symbols 210 to bit values 204. The bit values 204 may include a bit sequence, sequence of bits, set of bits, or other arrangements of bits. The symbols 210 may include combinations of words as described above in connection with FIG. 1. The symbol table 202 may be generated by one or more computer systems based at least in part on a dictionary provided to the one or more computers systems. For example, a dictionary, such as the dictionary described above in connection with FIG. 1, may be seeded with one or more sets of words, a computer system may then select words from the dictionary to include in a particular symbol and determine the corresponding mapping to one or more bit values. In various embodiments, two or more symbols map to the same bit value and may be considered synonyms. Conversely, in some embodiments, a particular symbol may map to one or more bit values. The computer system may order or otherwise organize the words included in the dictionary before generating the symbol table 202. For example, the computer system may separate the words into corresponding elements of speech such as noun or verbs. For the purposes of the present disclosure, the various elements of speech, such as nouns and verbs, may be considered separate categories of words. For example, a set of nouns may be considered a separate category of words from a set of adjectives. Additionally, the computer system may place the words in alphabetical order, in order by length or some other order suitable for generating the symbol table 202. For example, the computer system may place the dictionary in alphabetical order such that the word 'arrow' appears earlier in the dictionary than the word 'zoo' and thereby the word 'arrow' may be used in generating a symbol included in the symbol table 202 before the word 'zoo.' In another example, the computer system may order the dictionary based at least in part on word length. In such a scenario, the word 'zoo' may be used in generating a symbol included in the symbol table 202 before the word 'arrow.'

The symbol table 202 may be generated by the computer system and provided to one or more other computer systems along with the dictionary. In various embodiments, the dictionary may be provided to the one or more computer systems and the one or more computer systems may each generate a symbol table 202. In such embodiments, the dictionary may include a set of rules, operations or instructions for generating the symbol table 202 based at least in part on the dictionary such that the one or more computer systems individually each generate identical symbol tables 202. The dictionary provided to the computer system may be seeded or otherwise include information corresponding to one or more users. For example, a service provider may seed the dictionary with information associated with a user's purchase history such as words obtained from books or movies the user has purchased. Furthermore, the user may be provided the option to select the seed used to generate the dictionary. In some embodiments, the user may select a set of books, movies, songs or other media suitable for seeding the dictionary, the service provider or computer system may then seed the dictionary based at least in part on the selection. The symbols include in the symbol table 202 may represent a variety of different information. For example, the symbols may be used to represent credit card numbers, gift card numbers, coupon codes, or other information.

FIG. 2 also illustrates translation of a symbol sequence 212 to a bit sequence 208. As described above, the symbol sequence 212 may include a set of symbols 210 representing bit values 204. In one example, the user may enter the symbol sequence 212 into a computer system using an input device connected to the computer system such as a mouse, keyboard, microphone or other input device configured to receive input from the user and provide information to the computer system based at least in part on the input received from the user. In the illustrated example in FIG. 2, the computer system may receive the symbol sequence 212 'yellow dog:white bird' from the user and translate the symbol sequence 212 into the corresponding bit sequence 208. In some embodiments, translation of the symbol 212 may involve determining the corresponding bit value 204 for at least a portion of the symbols 210 included the sequence and concatenating the bit values 204 together to obtain the bit sequence 208.

For example, as illustrated in FIG. 2, the symbol 210 'yellow dog' corresponds to the bit value 204 '000001' based at least in part on the symbol table 202. Furthermore, the symbol 210 'white bird' corresponds to the bit value 204 '001001,' therefore the symbol sequence 212 'yellow dog:white bird' may be translated by a computer system to the bit sequence 208 '000001:001001' based at least in part on the symbol table 202. In various embodiments, the symbol sequence 212 includes information, such as metadata or additional symbols, configured to provide the computer system receiving the symbol sequence 212 with sufficient information to translate the symbol sequence 212 to the corresponding bit sequence 208. For example, the symbol sequence 212 may include information corresponding to the dictionary used to generate the symbol table 202, the language or other information used to generate the dictionary, a name or other identifier of the symbol table 202 used to generate the symbol sequence 212, an algorithm for generating the symbol table 202 from the dictionary or other information suitable for translating the symbol sequence 212 to the bit sequence 208.

In some embodiments, translation of symbol sequence 212 may require the computer system to multiply the bit values of the symbols 210 included in the symbol sequence 212 in order to determine the bit sequence 208 as opposed to concatenation of the bit values. Other reversible permutations may be used on the bit values represented by the symbols 210 in order to increase the amount of information that may be represented by the symbol sequence 212. Furthermore, the translations may be reversible such that the symbol table 202 may be used to convert a bit sequence 208 into the corresponding symbol sequence. For example, using the symbol table 202 the bit sequence 208 '000001001001' may be translated to 'yellow dog:white bird.' Additionally, the bit sequence 208 may be compressed and then the symbol table 202 may be used to translate the compressed bit sequence 208 to the corresponding symbol sequence 212.

Figure 3:
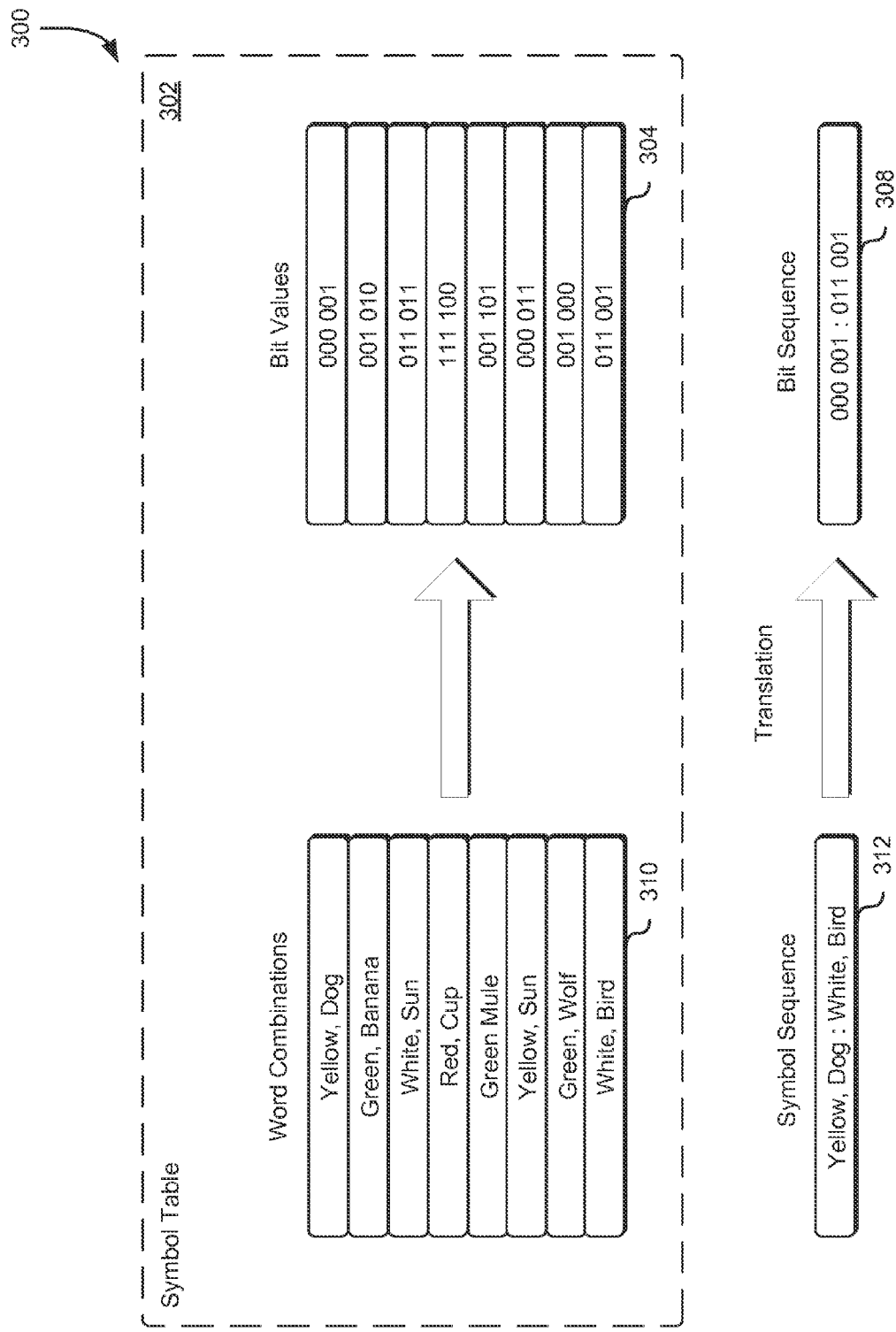
FIG. 3 is a diagram illustrating a mapping of human readable representations to corresponding bit values in accordance with at least one embodiment.

FIG. 3 shows a diagram 300 illustrating various aspects of the present disclosure. In the illustrated embodiment, the diagram 300 shows a symbol table 302 mapping symbols 310 to bit values 304. The symbols 310 may include combinations of words as described above in connection with FIG. 1. The symbol table 302 may be generated by one or more computer systems based at least in part on a dictionary provided to the one or more computers systems. For example, a dictionary, such as the dictionary described above in connection with FIG. 1, may be seeded with one or more sets of words, a computer system may then select words from the dictionary to include in a particular symbol and determine the corresponding mapping to one or more bit values. In the example illustrated in FIG. 3, each word from the dictionary is assigned a particular bit value. Therefore when a particular word appears in one or more symbols, the portion of the symbol corresponding to the particular word represents the same value. For example, as illustrated in FIG. 3, the word 'yellow' represents the bit sequence '000' and appears in two symbols 'yellow, dog' and 'yellow, sun' both symbols containing the bit sequence '000' in the same position as 'yellow' in the symbol as in the bit value 304.

Similarly, the mapping of words to bit values may be applied to symbol sequences include one or more combinations of words. For example, as illustrated in FIG. 3, the symbol 310 'yellow dog' corresponds to the bit value 304 '000001' based at least in part on the symbol table 302. Furthermore, the symbol 310 'white bird' corresponds to the bit value 304 '011001,' therefore the symbol sequence 312 'yellow dog:white bird' may be translated by a computer system to the bit sequence 308 '000001:011001' based at least in part on the symbol table 202.

Figure 4:
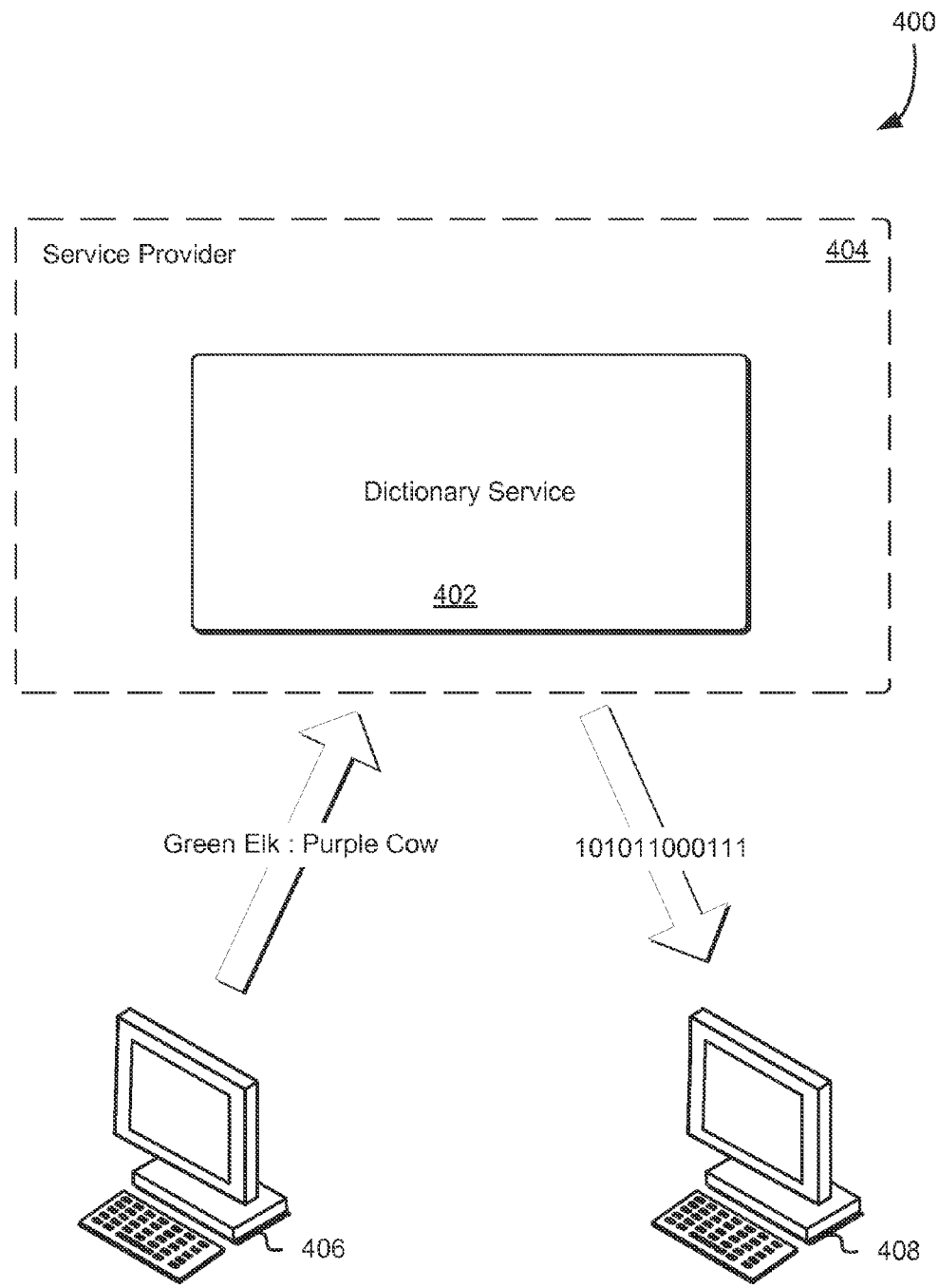
FIG. 4 is an illustrative example of an environment for providing human readable representations of binary or hexadecimal sequences in accordance with at least one embodiment.

FIG. 4 shows an illustrative example of an environment 400 in which human readable representations of binary or hexadecimal sequences may be provided to users. A dictionary service 402 operated by a service provider 404 may provide the human readable representations of binary or hexadecimal sequences for use by the users as well as translating the human readable representations to binary sequence from use by one or more other computer system. The dictionary 402 service may be a virtual computer system executed by one or more servers operated by the service provider 404. The dictionary service 402 may generate a dictionary and symbol table as described above in order to provide the user with the human readable representations. For example, the dictionary service may generate a particular dictionary and symbol table for use with a device or type of devices, such as mobile devices. The dictionary may then be provided as an application or integrated into the operating system as described in greater detail below in connection with FIG. 4. In some embodiments, the dictionary service 402 may be provided with a binary sequence from a computer system and may return a symbol or a set of symbols representing the obtained binary sequence.

In the example illustrated in FIG. 4, a first computing device 406 provides the dictionary service 402 with a set of symbols representing a binary sequence. For example, the first computer system 406 may generate a binary sequence to verify some portion of data (e.g., a checksum) obtained by the first computing device, the binary sequence may be translated to a set of symbols and displayed to the user of the first computing device 406 via a display device connected to the first computing device 406. The binary sequence may be translated by the first computing device 406 or may be provided by the first computing device 406 to the dictionary service 402 and the dictionary service 402 may translate the binary sequence and return the set of symbols in response. The set of symbols may then be read by the user and provided to the first computing device 406 through an input device, such as a keyboard, connected to the first computing device 406. In some embodiments, the user may provide the set of symbols to the dictionary service through a second device not illustrated in FIG. 4 for simplicity. For example, the user may read the set of symbols from a display device of the first computing device 406 and provide the set of symbols to the dictionary service 402 via the user's mobile device.

Once the set of symbols has been obtained by the dictionary service 402, the dictionary service 402 may translate the set of symbols using a symbol map as described above in connection with FIG. 2. The symbol set may include additional information such as information corresponding to one or more other computing devices 408 to which the dictionary service 402 will provide the translated symbol set. Additionally, the dictionary service 402 may request additional information from the first computing device, such as the dictionary or symbol table used to generate the set of symbols. The dictionary service 402 may then translate the set of symbols provided by the first computing device 406 and transmit the corresponding binary sequence to the one or more other computing devices 408.

In some embodiments, the dictionary service 402 may receive a binary sequence or other data can translate the received binary sequence or other data into a symbol or sequence of symbols. Additionally the dictionary service may insert one or more prepositions into the symbol or sequence of symbols in order to improve readability of the symbol or sequence of symbols. In various embodiments, the prepositions may be included in the dictionary and may represent one or more bit values. In such embodiments, the addition of a preposition may cause the symbol or sequence of symbols to represent a different bit sequence or other value than other embodiments described above where prepositions do not represent values.

Figure 5:
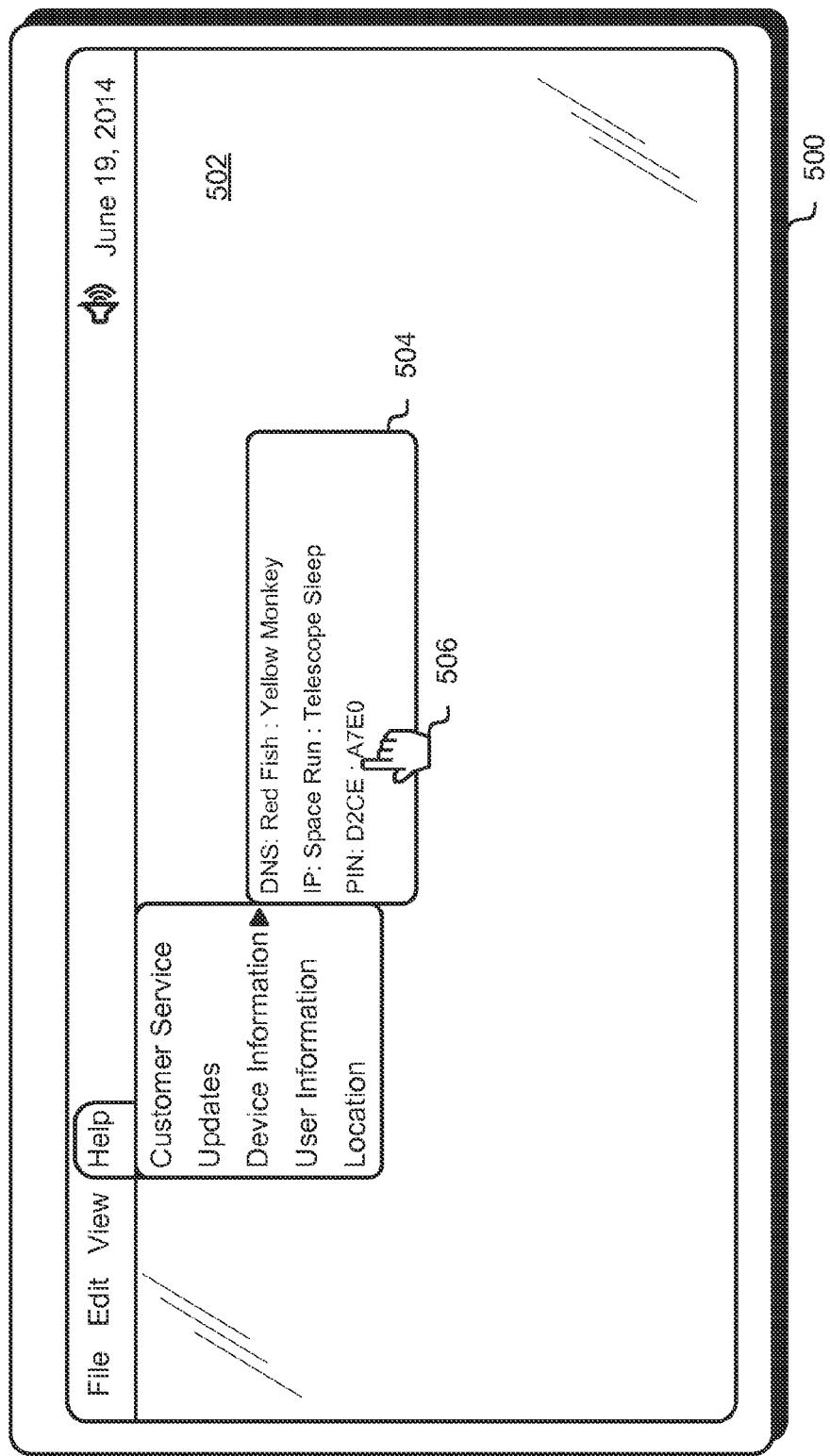
FIG. 5 is a diagram illustrating a user interface including human readable representations of binary or hexadecimal sequences in accordance with at least one embodiment.

FIG. 5 shows an illustrative example of a variation of the techniques described herein in accordance with various embodiments. In particular, FIG. 5 shows a display device 500, which displays a user interface 502. The display device 500 may be, for example, a computer monitor of a notebook or personal computer, a display of a mobile device, a display of a tablet computing device or otherwise a display of a computing device. In an embodiment, the user interface 502 is provided by an operating system of a computing device causing the user interface 502 to be displayed. In the particular example illustrated in FIG. 5, a display of an application menu 504 is displayed on the user interface 502. In some embodiments, the application menu 504 may be provided by the operating system on the computing device 500 as described above.

In this particular example, the application menu 504 displays several symbols representing particular binary sequence. The binary sequence represented in FIG. 5 includes a Domain Name System (DNS) address for a resource connected to the Internet (e.g., a webpage), an Internet Protocol (IP) address such as the IP address of the computing device and a Personal Identification Number (PIN). The information in the application menu 504 is represented by a symbol or a set of symbols as described above in connection with FIG. 1. For example, the DNS address is represented by the symbol sequence 'Red Fish: Yellow Monkey.' A user operating the computing device may then read the symbols from the display device 500 for various purposes. For example, the user may contact customer service and authenticate the computing device by reading the symbols corresponding to the PIN in application menu 504 and providing the symbols to a customer service representative. In some embodiments, the customer service representative may be a computer system operated by the service provider and may include speech recognition software in order to obtain the symbols from the user.

Additionally, the user may read the symbols from the application menu 504 and provide the symbols to another application executed by the computing device. For example, the user may read the symbols corresponding to the IP address from the application menu 504 and provide the symbols to a browser executed by the computing device. The browser may then translate the symbols into a binary sequence corresponding to a webpage and navigate to the webpage. As another example, the browser application may utilize a split architecture where at least a portion of webpage rendering and request submission is processed remotely from the user, such as with an Amazon® Silk Browser®. Additionally, the browser may receive the symbols from the user and transmit a request to another application executed by the computing device or another computing device for a translation of the symbols. For example, the browser application may transmit a request to a dictionary service for the binary sequence corresponding to the symbols as described above in connection with FIG. 4. Furthermore, the user may read the symbols from the application menu 504 and provide the symbols to another computing device. For example, the user may read the symbols corresponding to the DNS address from the application menu 504 and provide the symbols to a router or other network device. Similarly, the router or other network device may translate the symbols or may transmit a request to another computing device for the binary sequence corresponding to the symbols as described above.

The user interface 502 may include a cursor 506 enabling the user to interact with various elements of the user interface 502 and applications of the computer system connected to the display device 500. The cursor 506 may be an indicator used to show the position on a the display device 500 that will respond to input from input device or pointing device. As illustrated in FIG. 5, the cursor 506 may enable the user click on the information in the application menu 504 is represented by a symbol or a set of symbols as described above in connection with FIG. 1 and cycle through different representation of the information. For example, the information in the menu 504 may initially be displayed as a hexadecimal or binary string and the user may, by clicking on the representation, cause the user interface 502 or other component of the computer system to display the information as a symbol or set of symbols. Similarly, the menu 504 may be configured to display the information as a symbol or set of symbols and the user may by selecting and/or clicking on the symbol or set of symbols with the cursor 506 cause the hexadecimal, binary, or other representation of the information to be displayed.

FIG. 6 shows an illustrative example of environment 600 of an embodiment enabling use of human readable representations of binary or hexadecimal information. A symbol table may be used to convert a binary sequence into one or more symbols for use in a pairing operation between a first and a second device as illustrated in FIG. 6. The second device may include a mobile device 612 and the first device may include a display device 604 connected to a computing device as described above. By entering the one or more symbols 618 into the computing device, the computing device may determine the PIN information required to complete the pairing operation. The one or more symbols 618 may represent an identifying sequence useable in identifying the PIN information. Such functionality may be achieved in various ways, such as by a user of the mobile device 612 obtaining the one or more symbols from a mobile device user interface 616 and inputting the one or more symbol into an input device of the computing device. The mobile device 612 and the computing device may then establish a communications channel based at least in part on the one or more symbols inputted by the users. The communications channel may be a short-range communication channel established using various technologies, such as induction wireless, infrared wireless (such as technologies operating according to specifications and protocols provided by the Infrared Data Association, or IrDA) or ultra wideband formats. Additionally, the communications channel may be establish for the purpose of providing information associated with the one or more symbols inputted by the user, such as information corresponding to the symbol table or a dictionary used to generate the symbol table. For example, the mobile device 612 may transmit the symbol table used to generate the one or more symbols to the computing device such that the computing device may translate the one or more symbols inputted by the user to the corresponding binary values. In another example, the mobile device 612 may transmit information corresponding to the type or version of the dictionary used to generate the symbols. The information may indicate to the computing device a particular symbol table useable in converting the one or more symbols entered by the user into the corresponding binary values or other information.

In some embodiments, the first and second devices may utilize short-range, low-power and high-frequency radio transmissions, such as Bluetooth®. In still other embodiments, the first and second devices may support acoustic-based data transfer. For example, the second device may include software components and a speaker that enable the second device to broadcast data to the first device as sound waves, while the first device may include software components and a microphone that enable the second device to receive the data embedded in the sound waves. Thus, one or more of radio signal-based data transfer (e.g., near field communication (NFC) or Bluetooth®), light-based data transfer (e.g., infrared data transfer), an acoustic-based data transfer (e.g., sound wave-embedded data) or magnetic field-based transfer (e.g., reading data from a magnetic stripe) may be used for inter-device communication. The protocols and components for enabling computing devices to perform the systems and methods of the present disclosure using such means for inter-device communication are well known to those skilled in the art of computer communications and thus, need not be described in more detail herein. Generally, embodiments described herein are not limited to those explicitly illustrated herein. Furthermore, the computing device may be configured to transmit the one or more symbols inputted by the user to a service provider or other computing system as described above in connection with FIG. 3.

The mobile device 612 may be operating in accordance with a corresponding operating system such as a version of an Android® operating system, a Windows® phone operating system or an Apple® iOS® operating system, although the techniques of the present disclosure are not limited to those operating systems discussed explicitly herein. The mobile device 612 may be the computing device as described above in connection with FIG. 4. For example, the mobile device may be a smartphone or table computing device, although the techniques described in connection with FIG. 6 are not limited to such devices.

The display device 604, which displays a user interface 602 may enable a user to perform various operations. The display device 604 may be a device as described above in connection with FIG. 6. In an embodiment, the user interface 602 is provided by an operating system of a computing device causing the user interface 602 to be displayed. In the particular example illustrated in FIG. 6, a display of an application 620 is displayed on the user interface 602. The application 620 may be, for example, an application associated with the mobile device 612 or may be a communications application. In this particular example, the application 620 provides a pairing screen 606 enabling the user to enter a PIN and pair the device 610 shown. In various embodiments, the application 620 may be a browser application configured to provide the one or more symbols inputted by the user to a dictionary service as described above in connection with FIG. 3.

The pairing screen 606 may be presented, for example, to enable the user to transmit information securely between the mobile device 612 and the computing device. Once the user has entered the one or more symbols using an input device, such as a microphone, the computing device may translate the one or more symbols into the corresponding binary sequence as described above in connection with FIG. 2. For example, the computing device may be configured with one or more symbol tables. The one or more symbol tables may be included in an application executed by the computing device. For example, the computing device may execute a dictionary application configured to translate binary information into symbols as well as translate symbols into binary information.

Figure 7:
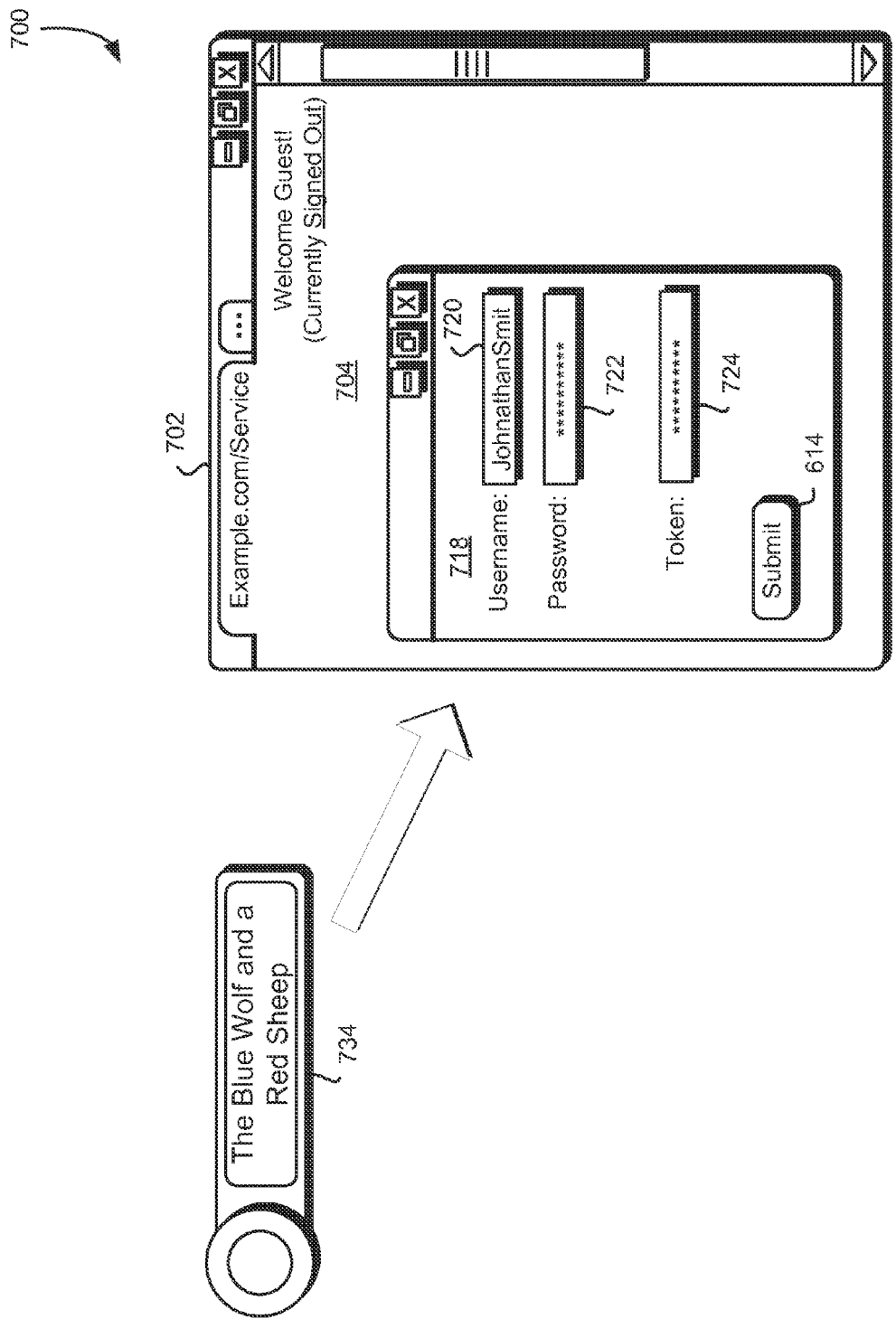
FIG. 7 is a diagram illustrating a security-related operation including human readable representations of binary or hexadecimal sequences in accordance with at least one embodiment.

FIG. 7 shows an illustrative example of an environment 700 of an embodiment enabling use of human readable representations of binary or hexadecimal information. One or more symbols may represent binary sequence as described above. As illustrated in FIG. 7, the one or more symbols may be used as a one-time password (OTP) obtained from a one-time password token 734. The one-time password token 734 may be a separate device from the computer device on which a browser application 702 executes or which may be integrated into the computing device. For example, a user may be given the one-time password token 734 as an additional security measure which may require the user to input information generated by the token in order to access one or more restricted computing resources.

Returning to FIG. 7, the browser application 702 may be executed on a computing device such as a personal computer, notebook computer, tablet computer, mobile phone or other device. Executable code for generating a graphical user interface 704 may be application code stored locally on a device executing the application or, as typical with browser applications, the code may be generated remotely and transmitted to the device executing the application to be executed with the code of the browser application 702. It should be noted however that various aspects of the present disclosure are applicable to other types of interfaces and are not limited to those provided through browser applications. For example, techniques of the present disclosure may be utilized in connection with mobile applications on a mobile device that utilizes network communications. In the illustrative example of FIG. 7, the browser application 702 displays a webpage 704 on which a login screen 718 is displayed which allows for the input of credentials for providing access to the one or more restricted computing resources.

The login screen 718 may include username field 720 and a password field 722 which, in this example, are graphical user interface elements that enable a user to enter (e.g., via a virtual or physical keyboard or other input device such as a microphone) alphanumeric input corresponding to, respectively, a username and password. As with all embodiments described herein, variations that utilize different credentials or additional credentials are also considered as being within the scope of the present disclosure. Additionally, the login screen 718 may include a token field 724 which allows for the input of an OTP obtained from the one-time password token 734. The OTP may provide additional security-related features, such as providing stronger authentication and proof of possession of the one-time password token 734.

Figure 8:
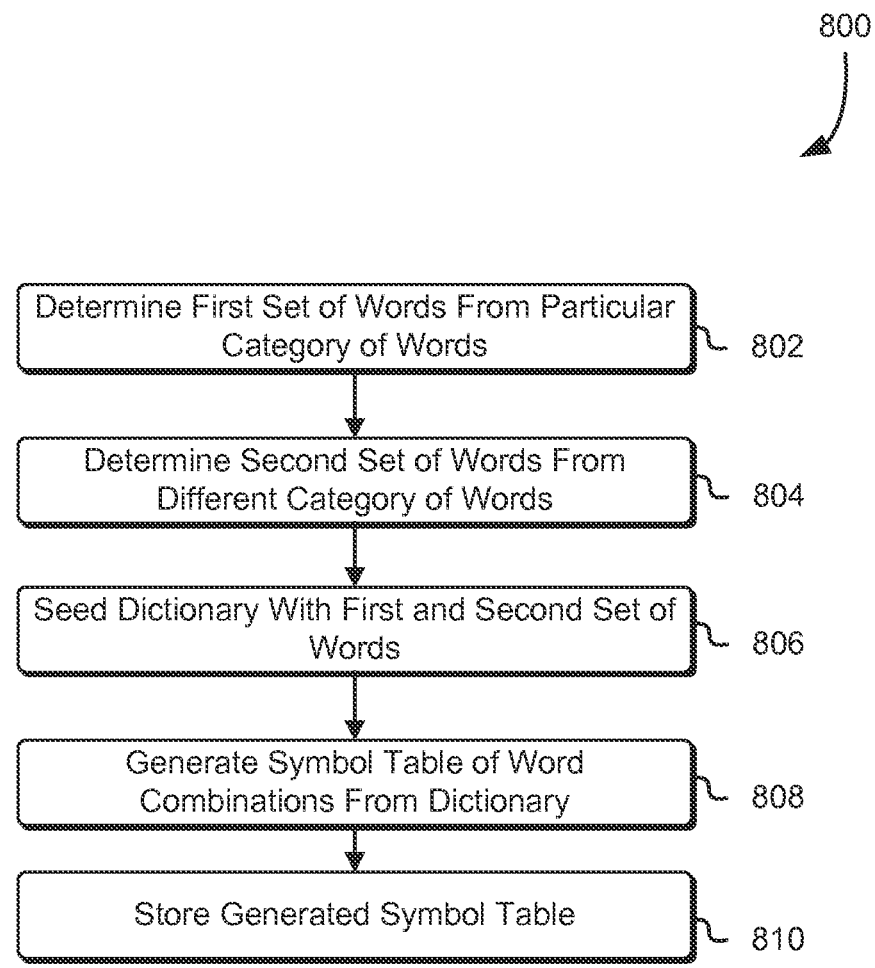
FIG. 8 shows an illustrative example of a process for generating a map of human readable representations in accordance with at least one embodiment.

The one-time password token 734 may be configured to display the OTP as a set of symbols representing a bit value or sequence of bit values. The symbols may be considered an identifying sequence that corresponds to an item, the OTP as illustrated in FIG. 8. In some embodiments, the set of symbols may represent a binary or hexadecimal sequence. The user may then enter the set of symbols in the token field 724 along with the username and password information into the username field 720 and the password field 722. The user may then select, using the appropriate input device such as a mouse or touchscreen, the graphical user interface element submit button 714, the submit button 714 may be configured to cause the browser application 702 to provide the inputted information to one or more computer systems or application executed by the computer systems. For example, selection of the submit button may cause the browser application 702 to transmit the username, password and token information provided through the login screen 718 to the service provider for verification. In some embodiments, the browser application 702 may provide all or some of the information from the login screen 718 to be provided to another application executed by the computing device executing the browser application. For example, the computing device may execute the browser application and a dictionary application, the dictionary application may be responsible for translating the one or more symbols entered into the token field 724 to the corresponding bit values. The dictionary application may be included in the browser application 702.

FIG. 8 shows an illustrative example of a process 800 which may be used to generate a dictionary and symbol table in accordance with various embodiments. The process may be performed by any suitable system, such as by the dictionary service described above, or generally, any device or collection of devices forming a distributed system that implements a mechanism for generating symbols representing binary data described herein. In an embodiment, the process 800 includes determining a first set of words from a particular category of words 802. For example, the dictionary service may determine a set of nouns to include in the dictionary. Furthermore, the determination of which nouns to include in the dictionary may be based at least in part on one or more restrictions on the type of nouns to include. For example, the nouns may be limited to a maximum length or may be restricted to common nouns such as flower, dog or cat. A second set of words selected from a second category of words different from the category of words the first set of words were selected from may be determined 804 by the dictionary service. For example, after the first set of words is selected from the set of nouns the second set of words may be selected from the set of verbs or adjectives. Similarly, the second set of words may be curated such that particular words are not included in the second set of words.

The system performing the process 800 may then seed the dictionary with the first and the second set of words 806. Although only two sets of words as described in connection with the process 800, any number of sets of words may be included in the dictionary in accordance with the present disclosure. For example, the dictionary service may be configured to include nouns, verbs and adjective as described above in connection with FIG. 1. The system performing the process 800 may then generate a symbol table including word combinations based at least in part on the dictionary 808. For example, the dictionary service may combine two verbs and one adjective from the dictionary in order to create a symbol. The symbol may then be mapped to a particular value such as a bit value. The system performing the process 800 may then store the generated symbol table 810 for use in converting one or more symbols to the corresponding bit value and/or converting one or more bit values to the corresponding symbols.

Figure 9:
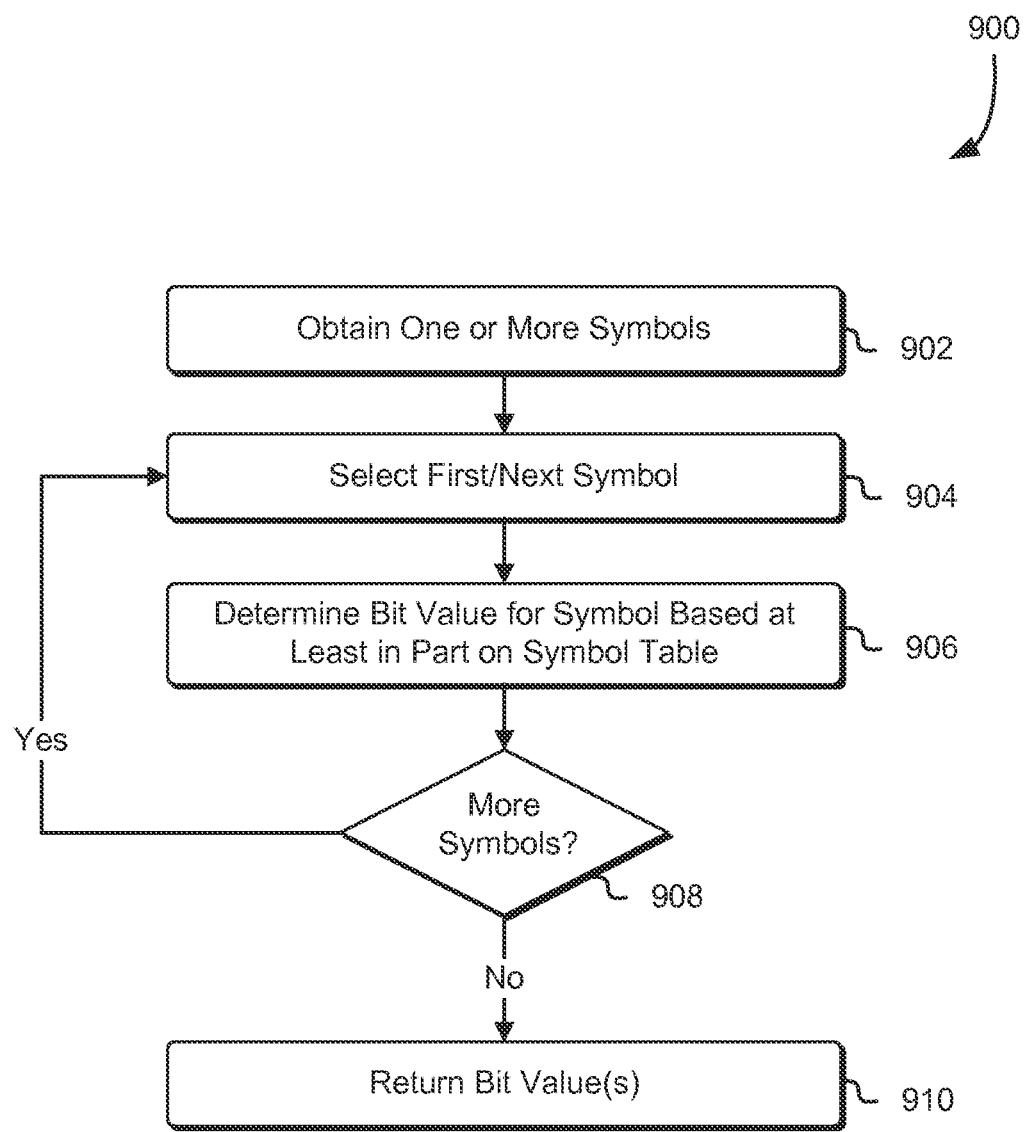
FIG. 9 shows an illustrative example of a process for determining a bit value based on a human readable representation in accordance with at least one embodiment.

FIG. 9 shows an illustrative example of a process 900, which may be used to determine a bit value corresponding to one or more symbols. The process may be performed by any suitable system, such as by the dictionary service described above, or generally, any device that implements the mechanism for generating symbols representing binary data described herein. In an embodiment, the process 900 includes obtaining one or more symbols 902. For example, the dictionary service may receive a set of symbols from a computing device where the set of symbols is provided by a user of the computing device. The one or more symbols may include a word combination described herein, such as an adjective-noun pair. The system performing the process 900 may then select the first/next symbol of the one or more symbols 904. The system performing the process 900 may then determine the bit value corresponding to the selected symbols based at least in part on a symbol table 906. The symbol table may be generated based at least in part on a dictionary and may map symbols to corresponding bit values as described above in connection with FIG. 2.

The system performing the process 900 may then determine if there are more symbols 908 from the obtained one or more symbols for which a bit value has not been determined. If the bit values for all of the obtained symbols have been determined, the system performing the process 900 may return the bit value(s). For example, as illustrated in FIG. 3, the dictionary service combined the bit values determined from the one or more symbols and transmitted the bit values either in response to the obtained one or more symbols or to another computer system indicated. If additional symbols for which a bit value is to be determined remain, the system performing the process 900 may select the next symbol 904 and continue with the process 900 as described above.

Figure 10:
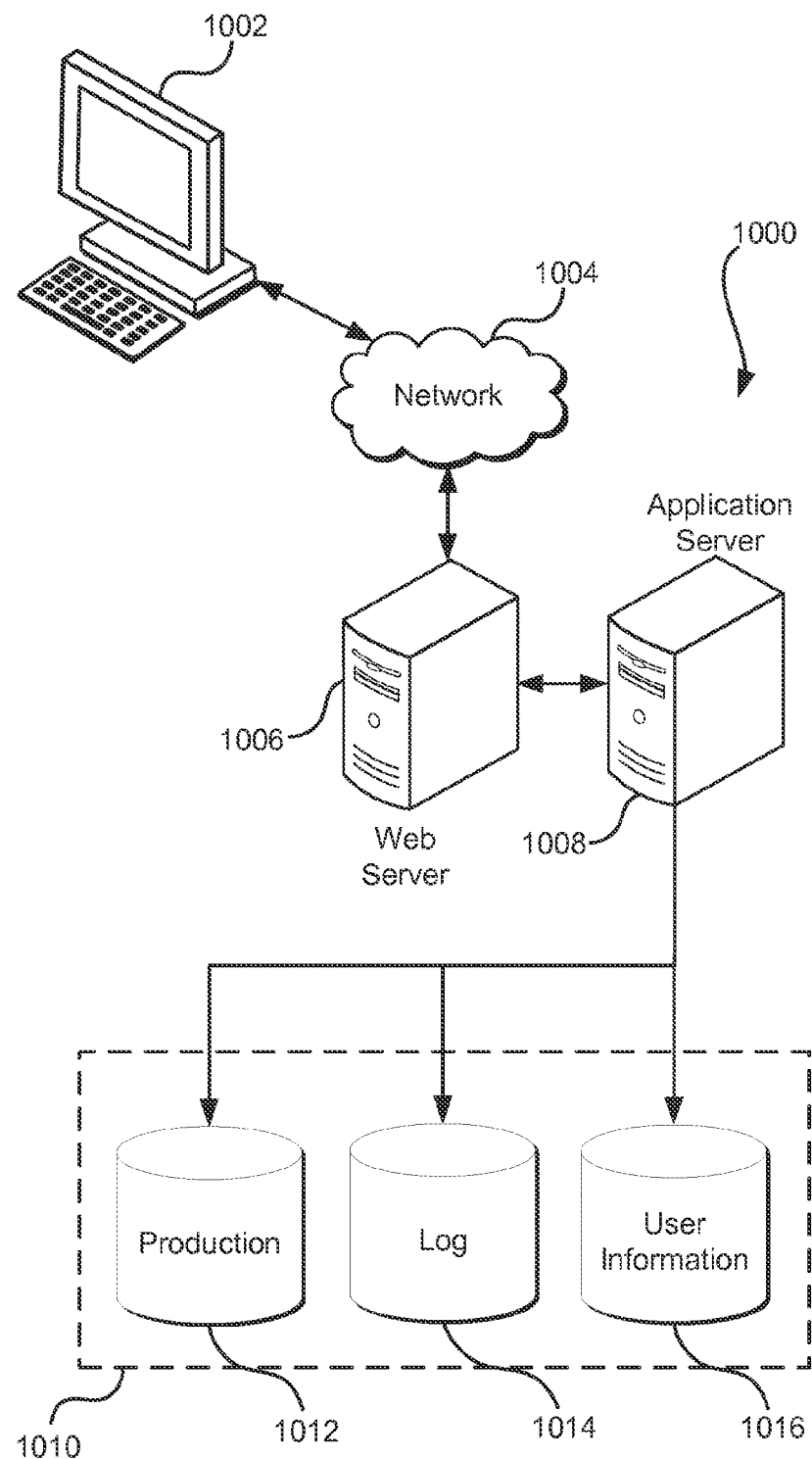
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1002 and the application server 1008, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
under control of one or more computer systems configured with executable instructions,
receiving a set of adjective-noun pairs including a symbol table usable in determining a bit sequence corresponding to at least one adjective-noun pair of the set of adjective-noun pairs;
determining a sequence of bit values by at least:
selecting an adjective-noun pair from the set of adjective-noun pairs; and
determining, based at least in part on the symbol table, the bit sequence corresponding to the adjective-noun pair, where the symbol table maps the selected adjective-noun pair to the bit sequence, the bit sequence including a set of bit values associated with a binary number; and
using the bit sequence to identify an item corresponding to an identifying sequence.

2. The computer-implemented method of claim 1, wherein the set of adjective-noun pairs further includes a preposition.

3. The computer-implemented method of claim 1, wherein the computer-implemented method further comprises:
generating a dictionary including adjectives and nouns; and
generating the symbol table based at least in part on the dictionary, where the symbol table includes adjectives selected from the dictionary with corresponding bit sequences and nouns selected from the dictionary with corresponding bit sequences.

4. A system, comprising:
at least one computing device that:
generates a dictionary by at least:
seeding a first dictionary with a first set of morphemes and a second dictionary with a second set of morphemes; and
removing one or more words included in the first dictionary or the second dictionary based at least in part on the one or more words being a homonym, homophone, homograph, or heteronym of another word included in the first dictionary or the second dictionary;
obtains a value including a set of bits representing a binary number;
generates a symbol for the value, where the symbol includes at least two morphemes, a first morpheme selected from the first set of morphemes of the first dictionary and a second morpheme selected from the second set of morphemes of the second dictionary, the first set of morphemes of a first category and the second set of morphemes of a second category; and
provides a representation of the value based at least in part on the generated symbol.

5. The system of claim 4, wherein the morphemes are words.

6. The system of claim 4, wherein the first category comprises a set of nouns and the second category comprises a set of adjectives.

7. The system of claim 4, wherein the first set of morphemes and the second set of morphemes include words selected from a writing system with single-character nouns.

8. The system of claim 4, wherein generating the symbol further includes:
determining a position to insert a preposition into the symbol such that the preposition and at least two morphemes included in the symbol are in grammatically correct positions; and
inserting the preposition into the determined position.

9. The system of claim 4, wherein the value corresponding to a particular symbols is such that a first symbol consisting of the first morpheme followed by the second morpheme represents a different value than a second symbol consisting of the second morpheme followed by the first morpheme.

10. The system of claim 4, wherein generating the symbol corresponding to the value is based at least in part on a map indicating the value represented by a particular symbol.

11. A non-transitory computer-readable storage medium having stored thereon executable instructions that, when executed by one or more processors of a computer system, cause the computer system to at least:
obtain a first representation of a bit value associated with a binary representation of a value that is based at least in part on a first symbol from a first set of symbols included in a symbol table, the first symbol including two or more morphemes including a first morpheme from a first set of morphemes and a second morpheme from a second set of morphemes;
determine a set of second symbols corresponding to the first symbol; and
provide a second representation of the bit value including the set of second symbols.

12. The non-transitory computer-readable storage medium of claim 11, wherein the instructions that cause the computer system to determine the set of second symbols corresponding to the first symbol further include instructions that cause the computer system to determine the bit value for the first symbol based at least in part on a symbol table mapping symbols of the first set of symbols to corresponding bit values.

13. The non-transitory computer-readable storage medium of claim 11, wherein the instructions that cause the computer system to determine the set of second symbols further include instructions that cause the computer system to concatenate a particular symbol of the set of second symbols a previous symbol of the set of second symbols.

14. The non-transitory computer-readable storage medium of claim 11, wherein the instructions that cause the computer system to obtain the first representation of the value further include instructions that cause the computer system to obtain the first set of symbols from an input device connected to the computer system.

15. The non-transitory computer-readable storage medium of claim 11, wherein the first set of morphemes and the second set of morphemes are disjoint.

16. The non-transitory computer-readable storage medium of claim 11, wherein the instructions further comprise instructions that, when executed by the one or more processors, cause the computer system to perform a query for the second representation of the value represented by the second set of symbols.

17. The non-transitory computer-readable storage medium of claim 11, wherein the instructions further comprise instructions that, when executed by the one or more processors, cause the computer system to:

generate a dictionary including adjectives and nouns;

generate a symbol table based at least in part on the dictionary, where the symbol table includes adjective-noun pairs selected from the dictionary and corresponding bit sequences to the adjective-noun pairs; and determine the set of second symbols based at least in part on the symbol table.

18. The non-transitory computer-readable storage medium of claim 11, wherein the instructions further comprise instructions that, when executed by the one or more processors, cause the computer system to:

obtain information specifying a dictionary used to generate the first set of symbols; and determine the set of second symbols corresponding to the first symbol based at least in part on the dictionary used to generate the first set of symbols.

19. The computer-implemented method of claim 3, where generating the dictionary further includes removing one or more adjectives or nouns included in the dictionary for being a homonym, homophone, homograph, or heteronym of another word included in the dictionary.

20. The system of claim 4, wherein the morphemes include one or more adjectives or nouns.

\* \* \* \* \*